United States Patent
Kojima (10) Patent No.: US 12,265,744 B2
(45) Date of Patent: Apr. 1, 2025

(54) INFORMATION PROCESSING SYSTEM, PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Ryoko Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/303,312

(22) Filed: Apr. 19, 2023

(65) Prior Publication Data
US 2023/0342097 A1  Oct. 26, 2023

(30) Foreign Application Priority Data
Apr. 26, 2022 (JP) .................. 2022-072059

(51) Int. Cl.
*G06F 15/00* (2006.01)
*G06F 3/12* (2006.01)

(52) U.S. Cl.
CPC .......... *G06F 3/1268* (2013.01); *G06F 3/1204* (2013.01); *G06F 3/1253* (2013.01); *G06F 3/1267* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 8,893,151 B2* | 11/2014 | Horiyama | ............ | G06F 3/1285 726/28 |
| 2009/0303518 A1* | 12/2009 | Sekiya | ............... | H04N 1/32101 358/1.15 |
| 2014/0063553 A1* | 3/2014 | Bhatia | .................... | G06F 3/1288 358/1.15 |
| 2021/0170772 A1* | 6/2021 | Maeda | ................. | B41J 2/16505 |

FOREIGN PATENT DOCUMENTS

JP  2014089648 A  5/2014

* cited by examiner

*Primary Examiner* — Mark R Milia
(74) *Attorney, Agent, or Firm* — Canon U.S.A., Inc. IP Division (57) ABSTRACT

A printing apparatus receives designation of a use purpose via a user interface of the printing apparatus, controls execution of a job, and transmits a job log regarding the execution of the job to a server, wherein the job log includes information about the designated use purpose.

13 Claims, 8 Drawing Sheets

INFORMATION PROCESSING SYSTEM, PRINTING APPARATUS, CONTROL METHOD, AND NON-TRANSITORY COMPUTER-READABLE STORAGE MEDIUM

BACKGROUND

Field

The disclosure relates to an information processing system for counting and managing job logs of a printing apparatus, a printing apparatus, a control method, and a non-transitory computer-readable storage medium.

Description of the Related Art

Among those printers used in corporate offices, there is a type of printer capable of managing print records of the printer registered with a business system through cloud collaboration. Such a printer capable of managing print records is assumed to be installed in an office and used only for a business use, and all the print records are managed by the printer. Along with the rapid increase of teleworking (working at home) in recent years, there have been needs to use home printers for work, so as to reduce the initial cost to install printers.

Japanese Patent Application Laid-open No. 2014-89648 discusses a method for managing print records of printing operations executed for a business use, in a case where some content under the control of a business system is printed using a printer in a remote-work environment at home, by aggregating the print records using logs for identifying the printed content.

According to the method for managing the print records of printing operations executed for a business use discussed in Japanese Patent Application Laid-open No. 2014-89648, only printing of the content under the management of the business system is a management target. If all the content is to be under the management of the business system in the remote-work environment, the content needs to be registered and approved, which causes inconvenience.

SUMMARY

According to embodiments of the present disclosure, an information processing system includes a printing apparatus and a server, wherein the printing apparatus comprises a first memory that stores first instructions, and a first processor that executes the first instructions to perform receiving a designation of a use purpose via a user interface of the printing apparatus, controlling execution of a job, and transmitting a job log regarding the execution of the job to the server, wherein the job log includes information about the designated use purpose, and wherein the server comprises a second memory that stores second instructions, and a second processor that executes the second instructions to perform receiving the job log from the printing apparatus, determining whether to store the job log based on information about the designated use purpose included in the job log, and storing the job log determined to be stored.

Further features of the present disclosure will become apparent from the following description of exemplary embodiments with reference to the attached drawings.

DESCRIPTION OF THE EMBODIMENTS

Figure 1:
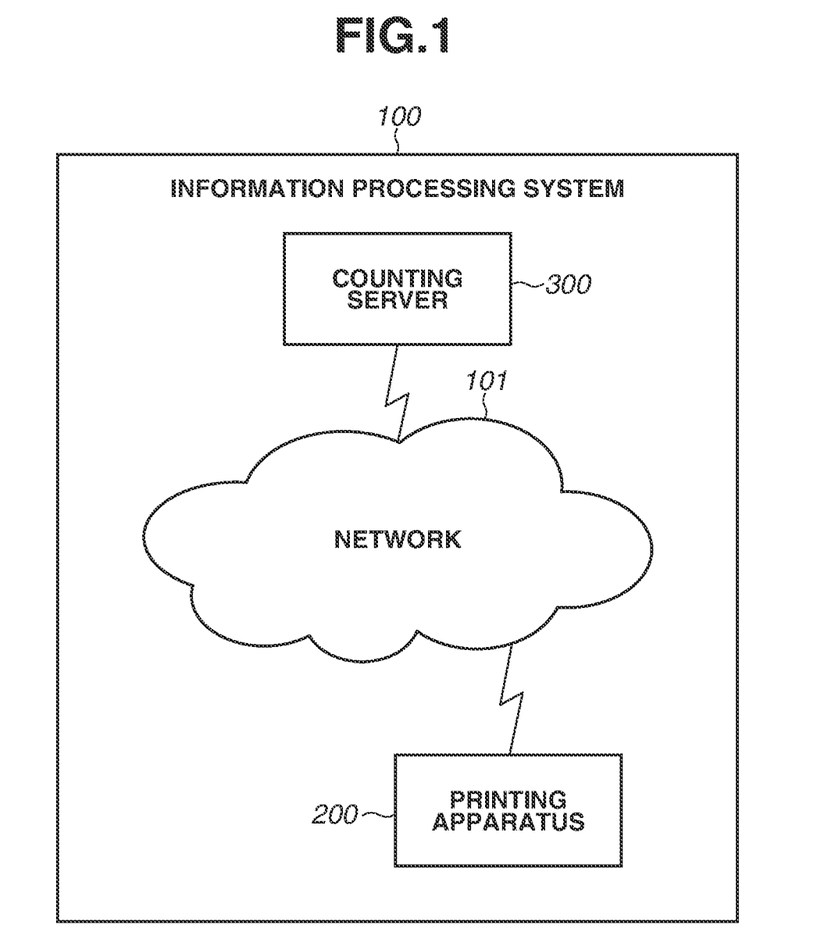
FIG. 1 is a diagram illustrating an information processing system according to a first exemplary embodiment.

A system configuration according to a first exemplary embodiment will be described with reference to FIG. 1. FIG. 1 is a diagram schematically illustrating an entire system configuration of an information processing system according to the present exemplary embodiment. An information processing system 100 includes a network 101, and a printing apparatus 200 and a counting server 300 that are communicably connected with each other via the network 101.

Figure 2A:
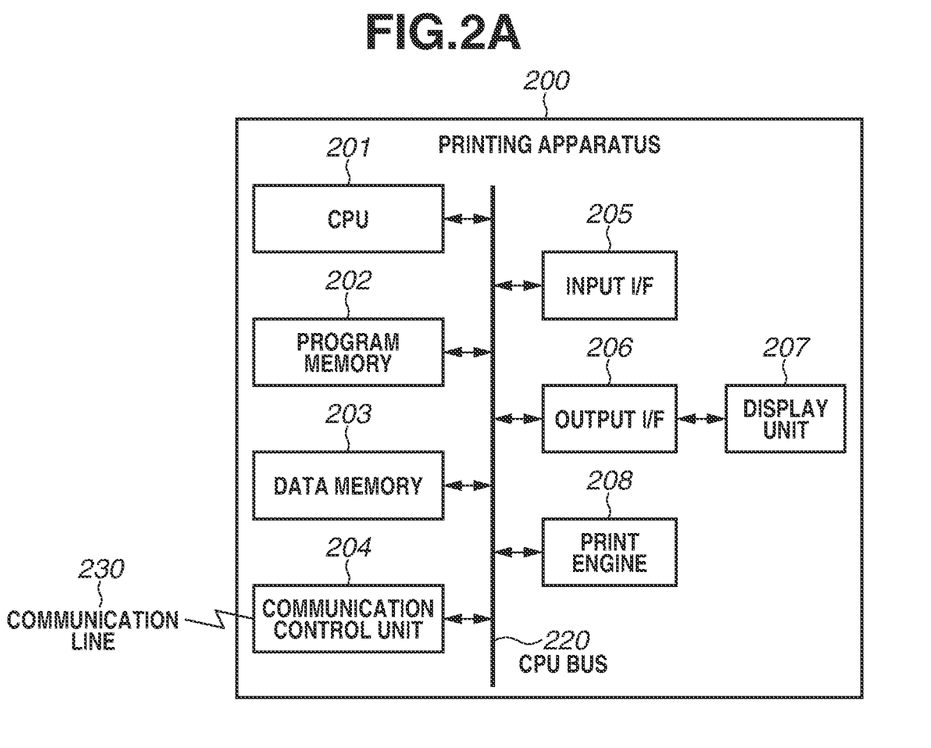
FIGS. 2A and 2B are block diagrams illustrating a configuration of a printing apparatus in the information processing system according to the first exemplary embodiment.

FIG. 2A is a block diagram illustrating a configuration of the printing apparatus 200 according to the present exemplary embodiment. The printing apparatus 200 includes a central processing unit (CPU) 201, a program memory 202, a data memory 203, a communication control unit 204, an input interface (I/F) 205, an output I/F 206, a display unit 207, and a print engine 208.

The CPU 201 is a system control unit for controlling the entire printing apparatus 200. The program memory 202 stores a control program, a built-in operating system program, and the like, to be executed by the CPU 201. The data memory 203 stores program control variables and the like. The communication control unit 204 includes various work buffer areas used at the time of a processing of the print engine 208, and controls data transmission and reception to and from an external device via a communication line 230.

The input I/F 205 is an interface for receiving data inputs and operation instructions from a user, and is configured of, for example, a physical keyboard, buttons, and a touch panel.

In addition, the output I/F 206 to be described below and the input I/F 205 may be integrally configured, and output of a screen and reception of an operation from a user may be performed with the same configuration. The output I/F 206 is an interface for controlling the display unit 207 to display data and to notify a user of a status of the printing apparatus 200.

The display unit 207 is configured of, for example, light-emitting diode (LED) display and a liquid crystal display (LCD), and performs data display and makes notification of a status of the printing apparatus 200. In addition, a software keyboard, including numeral input keys, a mode setting key, a determination key, a cancel key, and a power key, may be provided on the display unit 207, to receive an input from a user via the display unit 207.

The print engine 208 forms an image on a recording medium such as a paper sheet using a recording material such as ink, based on information stored in the data memory 203 and a received print job, and outputs a print result.

The above-described components 201 to 206, and 208 are connected with each other via a CPU bus 220 managed by the CPU 201.

Figure 2B:
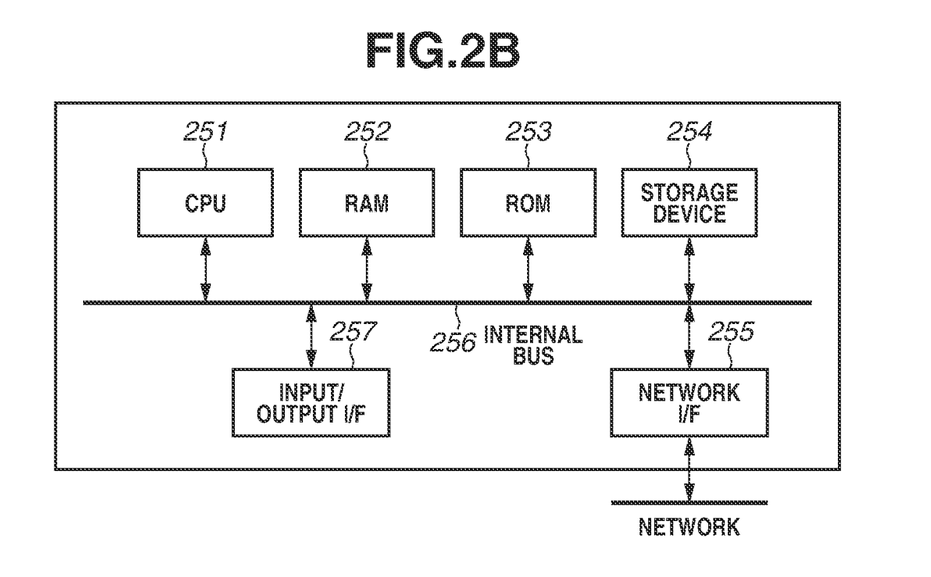

FIG. 2B is a block diagram illustrating an example of a hardware configuration of an information processing apparatus. The information processing apparatus according to the present exemplary embodiment includes the counting server 300 and a print service server 500. Further, in a case where those functions as the counting server 300 and the print service server 500 are provided by a cloud environment, a server computer for establishing the cloud environment is also included in the information processing apparatus.

The information processing apparatus includes a CPU 251 that executes programs stored in a read-only memory (ROM) 253, and comprehensively controls components via an internal bus 256. A random access memory (RAM) 252, the ROM 253, a storage device 254, a network I/F 255, and an input/output I/F 257 are connected to the internal bus 256. Further, the input/output I/F 257 includes, for example, a PS/2 OF (port), a Universal Serial Bus (USB) I/F, and an analog or digital display I/F. A keyboard, a mouse, a cathode-ray tube (CRT) display or an LCD, which are not illustrated, can be connected to the information processing apparatus via the input/output I/F 257. The information processing apparatus performs communication using a local area network (LAN), an intranet, or the Internet via the network I/F 255. In this way, the information processing apparatus can communicate with network devices, and other information processing apparatuses. The CPU 251 executes programs in cooperation with the RAM 252 and the ROM 253. Further, the CPU 251 can execute a program for implementing a virtual technique. Further, the CPU 251 performs processing of recording data in a recording medium such as the storage device 254. The storage device 254 functions as an external storage device to store various kinds of information. In addition, the storage device 254 can store various kinds of system information and processing information, instead of the RAM 252.

Figure 3:
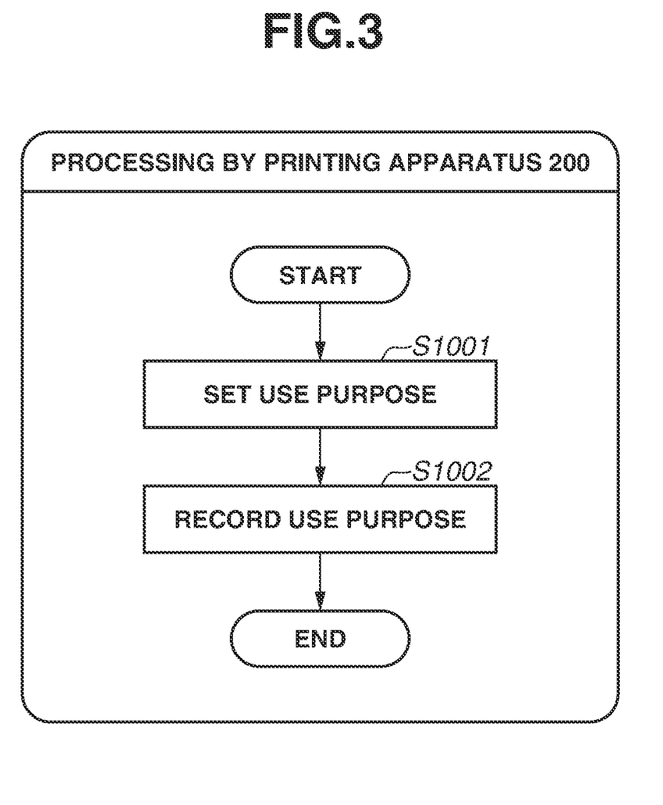
FIG. 3 is a flowchart illustrating processing for setting a use purpose of the printing apparatus according to the first exemplary embodiment.

Next, with reference to FIG. 3, a use purpose designation sequence according to the first exemplary embodiment will be described.

Figure 6:
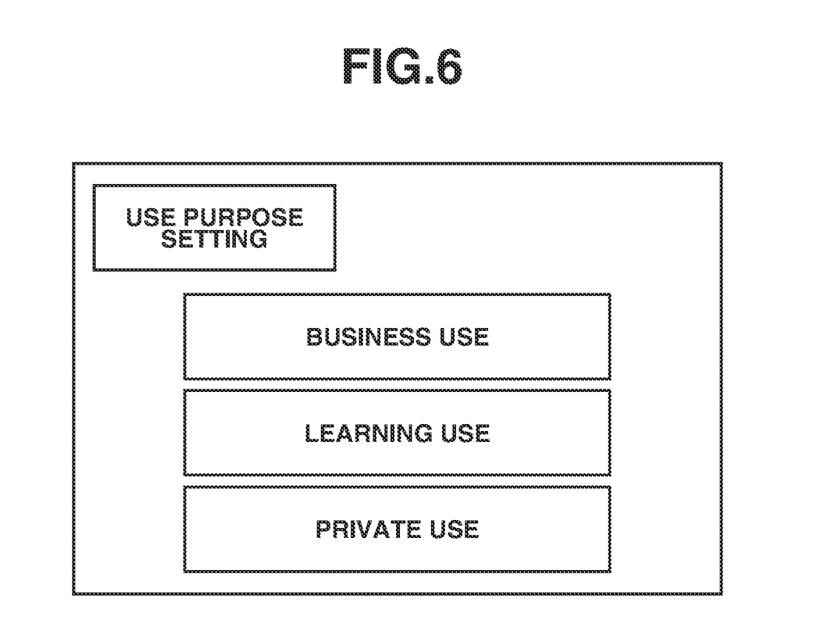
FIG. 6 is a use purpose setting screen displayed by the printing apparatus according to the first exemplary embodiment.

In step S1001, the printing apparatus 200 provides a use purpose setting screen illustrated in FIG. 6 to a user via the output I/F 206 and the display unit 207, and the user sets in advance the use purpose of printing to be performed via the input I/F 205. In FIG. 6, the user can select one of "business use", "learning use", and "private use", as the use purpose of the printing apparatus 200.

Alternatively, options displayed at this time may be "business use" and "other than business use". In step S1002, the printing apparatus 200 records the input use purpose setting in the program memory 202. The use purpose setting method in step S1001 is just an example, and the use purpose setting may be received from an external host terminal, which is not illustrated in FIG. 1, via the communication line 230.

Figure 4:
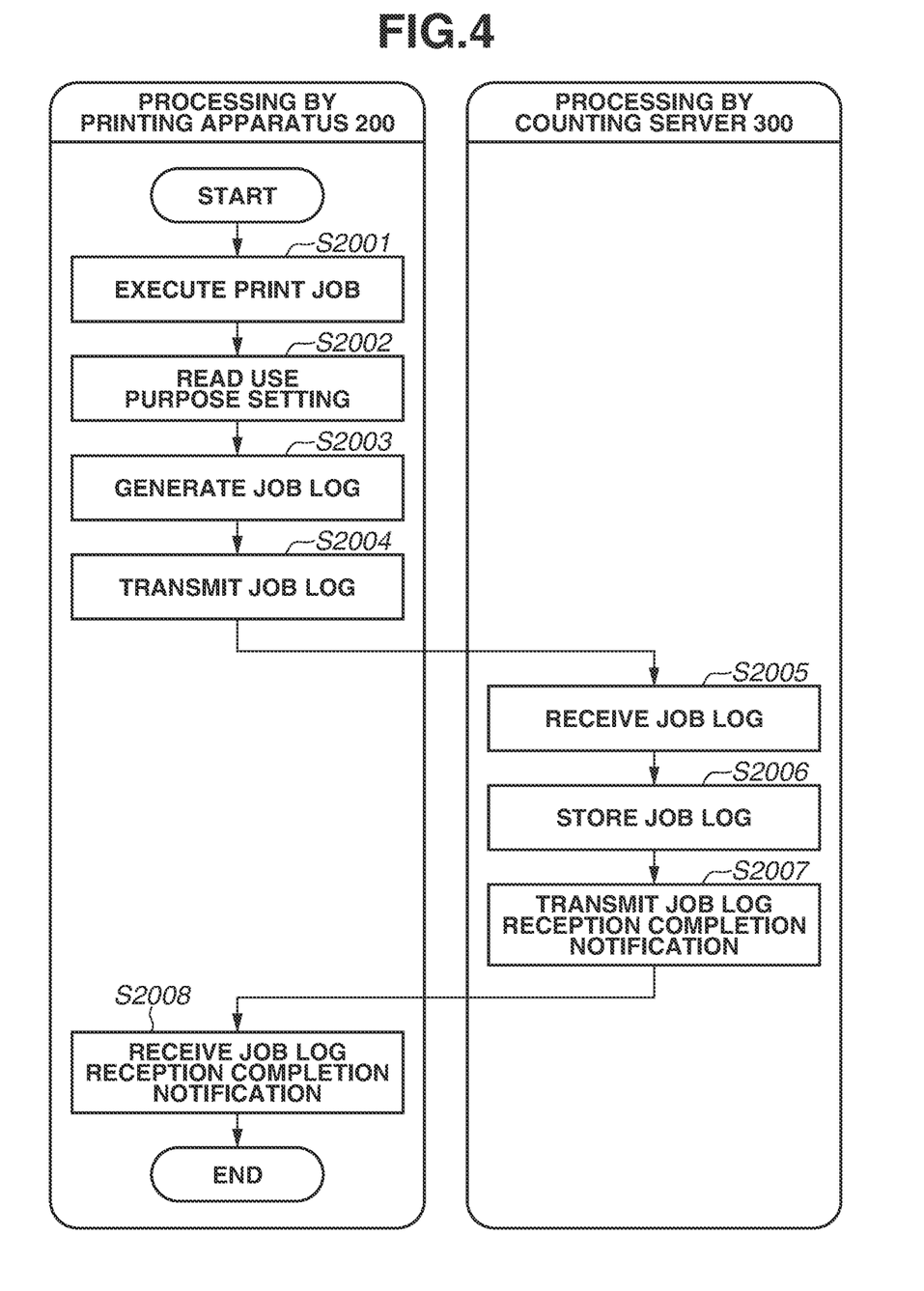
FIG. 4 is a flowchart illustrating processing of generating a job log including a use purpose of the printing apparatus, and transmitting the generated job log to a counting server according to the first exemplary embodiment.

Next, with reference to FIG. 4, a sequence of processes to generate and transmit a job log according to the first exemplary embodiment will be described. In step S2001, the printing apparatus 200 executes a print job in response to a print or copy instruction, and then, ends the print job. After completing the print job, then in step S2002, the printing apparatus 200 reads the use purpose setting recorded in step S1002 in FIG. 3. In step S2003, the printing apparatus 200 generates a job log, which is a log with the read use purpose setting added thereto. The job log generated may include, other than the use purpose setting, a print setting such as a current number of printed sheets and print quality, and job information such as an amount of ink consumed and job execution success/failure, as information to be managed after the printing apparatus 200 determines that the printing is for a business use. In step S2004, the printing apparatus 200 transmits the job log generated in step S2003 to the counting server 300 via the communication line 230. In step S2005, the counting server 300 receives the job log transmitted in step S2004. In step S2006, the counting server 300 stores the job log. After storing the job log, then in step S2007, the counting server 300 transmits a job log reception completion notification to the printing apparatus 200 to notify the printing apparatus 200 that the job log has been received. In step S2008, the printing apparatus 200 receives the job log reception completion notification, and the processing is ended.

Figure 5:
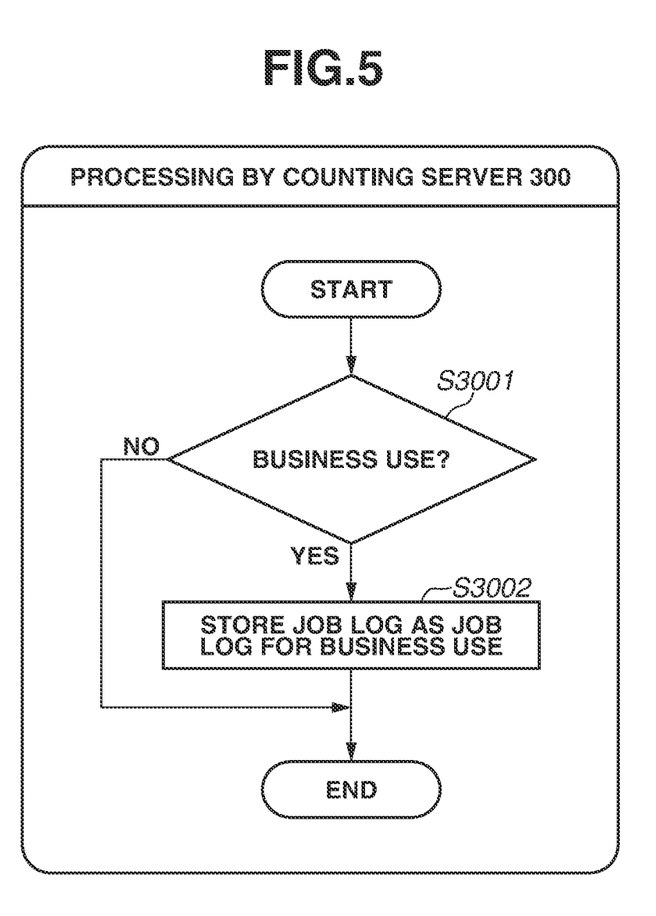
FIG. 5 a flowchart illustrating processing for determining whether a job log is for a business use by the counting server according to the first exemplary embodiment.

Next, with reference to FIG. 5, a sequence of processes to determine that a job log is for a business use according to the first exemplary embodiment will be described. In step S3001, the counting server 300 reads the job log stored in step S2006, and determines whether the use purpose is a business use from the added information. In a case where the counting server 300 determines that the use purpose is a business use (YES in step S3001), the processing proceeds to step S3002. In step S3002, the counting server 300 stores the job log as a job log for a business use, which is different from the job log stored in step S2006. All the job logs are stored in the sequence in FIG. 4, although at a time when the counting server 300 receives the job log in step S2005, the counting server 300 may determine in step S3001 whether the job log is for a business use, and may store and accumulate only job logs for a business use.

According to the first exemplary embodiment, it is possible to appropriately determine whether to store a job log, based on information about a use purpose input by a user via an UI screen displayed on the display unit 207 of the printing apparatus 200.

In the present exemplary embodiment, the description is given of the case where the setting options for the use purpose setting illustrated in FIG. 6 are displayed, and the counting server 300 determines whether the use purpose is a business use in step S3001. Alternatively, the counting server 300 may determine the use purpose, from other information and the print setting in addition to the use purpose setting. As an example of the other information, in a case where the printing is performed from an external host, a terminal identifier (ID) of the external host may be added to the job log, and the counting server 300 may determine that the printing is performed for a business use from a corporate terminal. Similarly, an application name used for the printing may be added to the job log, and the counting server 300 may determine that the printing is for a business use if the application is a specific application used only for business. As another example of the other information, time information may be added to the job log, and the counting server 300 may determine that the printing is for a business use if the printing is performed during the business hours. Further, as an example of the print setting, the counting server 300 may determine that the printing is for a business use if the print medium is plain paper. Needless to say, the counting server 300 may determine that the printing is for a business use based on a combination of the information and the setting described above, and it can be expected that, by using the combination of the information and the setting to make the determination, the counting server 300 is able to manage job logs for a business use more accurately than a case where the counting server 300 determines that the printing is for a business use only based on the use purpose setting selected by the user.

By using the job logs stored as the job logs for a business use, the administrator of the company can keep track of the number of sheets printed and an amount of ink consumed by each employee working from home, and can make appropriate arrangements for consumable goods for each employee. The employees also can be aware of the number of sheets printed by themselves, and thus can refrain from performing unnecessary printing, for example, in a case where the number of sheets that the employees are allowed to use for printed is specified by the company.

Figure 7:
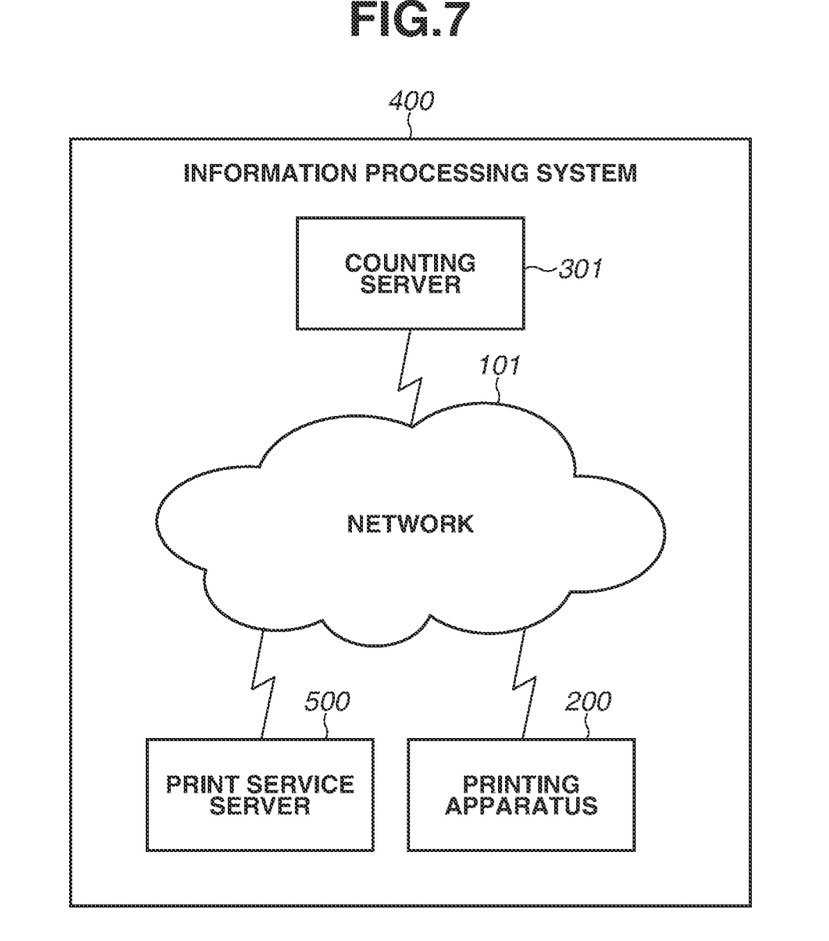
FIG. 7 is a diagram illustrating a configuration of an information processing system according to a second exemplary embodiment.

A second exemplary embodiment having a configuration different from the first exemplary embodiment will be described. A configuration of an information processing system according to the second exemplary embodiment will be described with reference to FIG. 7. FIG. 7 is a block diagram schematically illustrating an entire system configuration of the information processing system according to the present exemplary embodiment. An information processing system 400 includes a network 101, a printing apparatus 200 and a counting server 301 that are communicably connected with each other via the network 101, and a print service server 500. The configuration of the printing apparatus 200 according to the present exemplary embodiment is the same as that of the printing apparatus 200 according to the first exemplary embodiment, and the description thereof is omitted. The print service server 500 manages printing content when the printing content is uploaded from an external host (not illustrated), and the printing apparatus 200 can receive the printing content via the print service server 500, and print the printing content.

A sequence of processes to designate a use purpose according to the second exemplary embodiment is the same as the use purpose designation sequence described in the first exemplary embodiment, and the description thereof is omitted.

Next, with reference to FIG. 8, a description will be given of a sequence of processes to generate a job log including a use purpose setting and transmit the job log via the print service server 500 according to the second exemplary embodiment. In step S4001, the printing apparatus 200 executes a print job in response to a print or copy instruction, and then ends the print job. After completing the print job in step S4001, then in step S4002, the printing apparatus 200 reads from the program memory 202 the use purpose setting recorded in step S1002 in FIG. 3. In step S4003, the printing apparatus 200 generates a job log, which is a log with the read use purpose setting added thereto. In step S4004, the printing apparatus 200 transmits the job log generated in step S4003 to the print service server 500 via the communication line 230. In step S4005, the print service server 500 receives the job log. In step S4006, the print service server 500 determines whether the use purpose is a business use. In a case where the print service server 500 determines that the use purpose is a business use (YES in step S4006), the processing proceeds to step S4007. In step S4007, the print service server 500 transmits the job log to the counting server 301. In step S4008, the counting server 301 receives from the print service server 500 the job log determined as a job log for a business use. Then, in step S4009, the counting server 301 stores the job log. After storing the job log in step S4009, then in step S4010, the counting server 301 a job log reception completion notification to the printing apparatus 200 to notify the print service server 500 that the job log has been received. In step S4011, the print service server 500 also notifies the printing apparatus 200 that the job log has been received, in response to the job log reception completion notification from the counting server 301. In step S4012, the printing apparatus 200 receives the job log reception completion notification from the print service server 500, and the processing is ended.

In the first exemplary embodiment, the counting server 300 performs the determination of whether the use purpose is a business use. However, in the present exemplary embodiment, the print service server 500 performs the determination, and the counting server 301 does not perform the determination.

Figure 8:
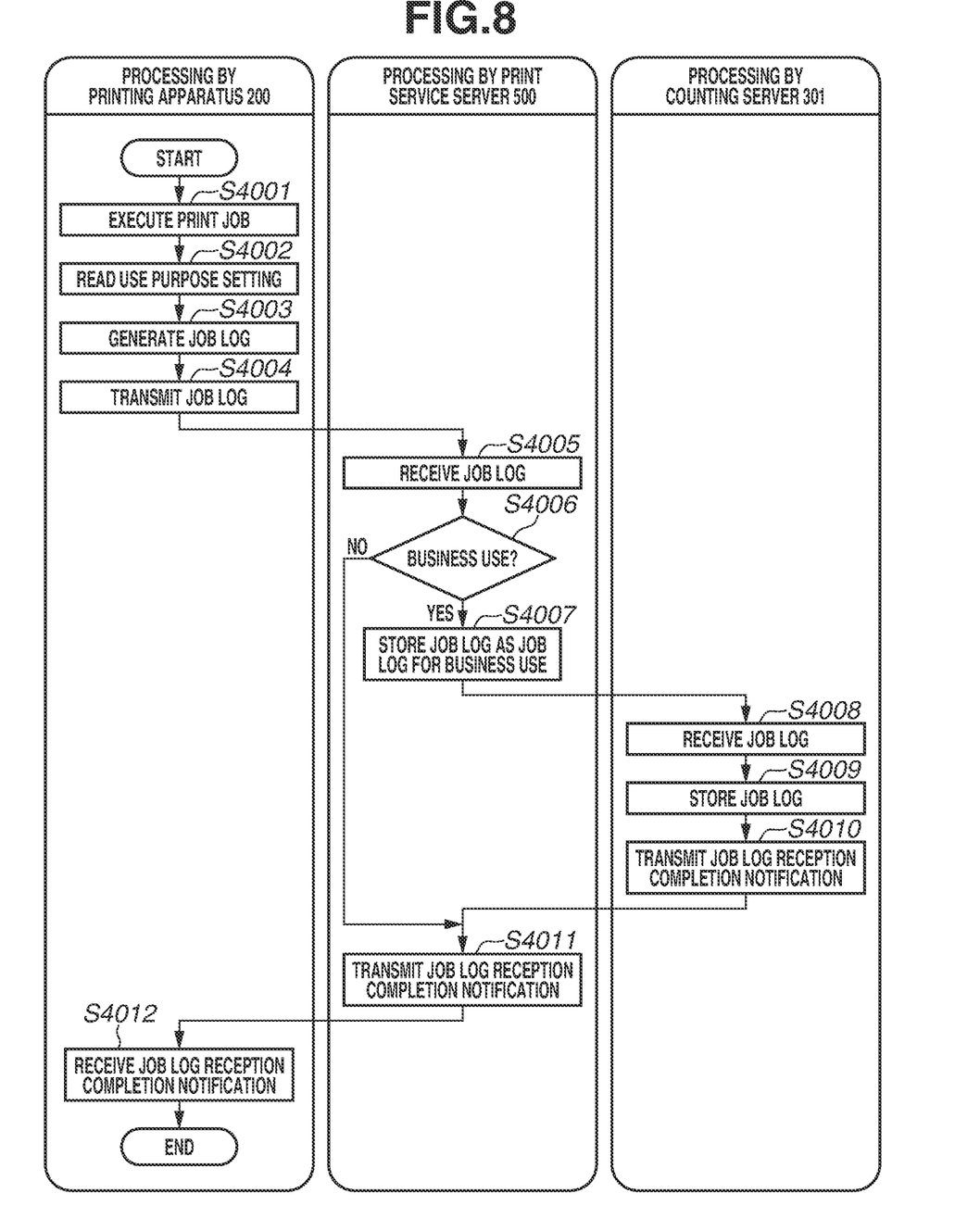
FIG. 8 is a flowchart illustrating processing of generating a job log including a use purpose of a printing apparatus, and transmitting the generated job log via a print service server according to the second exemplary embodiment.

In the sequence in FIG. 8, the printing needs not be necessarily performed via the print service server 500, and the job log may be generated only for the printing content uploaded to the print service server 500 as a printing target. At this time, the printing content is associated with the generated job log without approval of the printing content when uploaded. When the print service server 500 transmits the job log to the counting server 301, the associated printing content may be transmitted together, so that the counting server 301 can check the printing content.

By enabling the administrator of the company to check the printing content associated with the job log for a business use, the administrator of the company can check whether the content printed for a business use by the employee working from home is appropriate.

OTHER EMBODIMENTS

The present disclosure includes an apparatus or a system configured by combining the above-described exemplary embodiments as appropriate, and a method therefor.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072059, filed Apr. 26, 2022, which is hereby incorporated by reference herein in its entirety.

What is claimed is:

1. An information processing system including a printing apparatus and a server,
wherein the printing apparatus comprises:
a first memory that stores first instructions; and
a first processor that executes the first instructions to perform:
receiving a designation of a use purpose via a user interface of the printing apparatus, wherein the use purpose is selected out of a plurality of purposes including a business use and a private use;
controlling execution of a job;
determining whether information about the designated use purpose indicates the business use;
generating a job log regarding the execution of the job, the job log including the information about the designated use purpose; and
transmitting the generated job log regarding the execution of the job to the server, wherein, in a case where it is determined that the information about the designated use purpose indicates the business use, the generated job log further includes, as information to be managed, at least one of a print setting associated with the job and job information associated with the job, and
wherein the server comprises:
a second memory that stores second instructions; and
a second processor that executes the second instructions to perform:
receiving a plurality of job logs corresponding to a plurality of jobs from the printing apparatus;
storing the received plurality of job logs;
determining, for each of the stored plurality of job logs, to store a job log in a case where the information about the designated use purpose indicates the business use; and
storing, as a job log for the business use, the job log determined to be stored separately from the received and stored plurality of job logs.

2. The information processing system according to claim 1, wherein the second processor of the server determines not to store the job log in a case where the information about the designated use purpose indicates any one of a learning use and the private use.

3. The information processing system according to claim 1, wherein the printing apparatus transmits to the server printing content used for executing the job, in addition to the job log.

4. A printing apparatus comprising:
a memory that stores instructions; and
a processor that executes the instructions to perform:
receiving a designation of a use purpose via a user interface of the printing apparatus, wherein the use purpose is selected out of a plurality of purposes including a business use and a private use;
controlling execution of a job;
determining whether information about the designated use purpose indicates the business use;
generating a job log regarding the execution of the job, the job log including the information about the designated use purpose; and
transmitting the generated job log regarding the execution of the job to a server, wherein, in a case where it is determined that the information about the designated use purpose indicates the business use, the generated job log further includes, as information to be managed, at least one of a print setting associated with the job and job information associated with the job,
wherein the server:
receives a plurality of job logs corresponding to a plurality of jobs from the printing apparatus;
stores the received plurality of job logs;
determines, for each of the stored plurality of job logs, to store a job log in a case where the information about the designated use purpose indicates the business use; and
stores, as a job log for the business use, the job log determined to be stored separately from the received and stored plurality of job logs.

5. The printing apparatus according to claim 4, wherein the server performs control not to store the job log, in a case where the information about the designated use purpose indicates any one of a learning use and the private use.

6. The printing apparatus according to claim 4, wherein the user interface of the printing apparatus receives designation of any one of the business use, a learning use, and the private use as the use purpose of the printing apparatus.

7. The printing apparatus according to claim 4, wherein the printing apparatus transmits printing content used for executing the job, in addition to the job log.

8. The printing apparatus according to claim 4, wherein the print setting is information indicating a current number of printed sheets.

9. The printing apparatus according to claim 4, wherein the print setting is information indicating a print quality.

10. The printing apparatus according to claim 4, wherein the job information is information indicating an amount of ink consumed.

11. The printing apparatus according to claim 4, wherein the job information is information indicating job execution success or job execution failure.

12. A control method for a printing apparatus, the control method comprising:
receiving a designation of a use purpose via a user interface of the printing apparatus, wherein the use purpose is selected out of a plurality of purposes including a business use and a private use;
controlling the printing apparatus to execute a job;
determining whether information about the designated use purpose indicates the business use;
generating a job log regarding the execution of the job, the job log including the information about the designated use purpose; and
transmitting the generated job log regarding the execution of the job to a server, wherein, in a case where it is determined that the information about the designated use purpose indicates the business use, the generated job log further includes, as information to be managed, at least one of a print setting associated with the job and job information associated with the job,
wherein the server:

receives a plurality of job logs corresponding to a plurality of jobs from the printing apparatus;

stores the received plurality of job logs;

determines, for each of the stored plurality of job logs, to store a job log in a case where the information about the designated use purpose indicates the business use; and stores, as a job log for the business use, the job log determined to be stored separately from the received and stored plurality of job logs.

13. A non-transitory computer readable storage medium that stores a program, wherein the program causes a processor of a printing apparatus to perform:

receiving a designation of a use purpose via a user interface of the printing apparatus, wherein the use purpose is selected out of a plurality of purposes including a business use and a private use;

controlling execution of a job;

determining whether information about the designated use purpose indicates the business use;

generating a job log regarding the execution of the job, the job log including the information about the designated use purpose; and transmitting the generated job log regarding the execution of the job to a server, wherein, in a case where it is determined that the information about the designated use purpose indicates the business use, the generated job log further includes, as information to be managed, at least one of a print setting associated with the job and job information associated with the job, wherein the server:

receives a plurality of job logs corresponding to a plurality of jobs from the printing apparatus;

stores the received plurality of job logs;

determines, for each of the stored plurality of job logs, to store a job log in a case where the information about the designated use purpose indicates the business use; and stores, as a job log for the business use, the job log determined to be stored separately from the received and stored plurality of job logs.

* * * * *